US012746904B2

(12) United States Patent
Knop

(10) Patent No.: US 12,746,904 B2
(45) Date of Patent: Sep. 29, 2026

(54) VEHICLE BRAKE ACTUATOR AND ELECTROMECHANICAL BRAKE

(71) Applicant: ZF Active Safety GmbH, Koblenz (DE)

(72) Inventor: Volker Knop, Ulmen (DE)

(73) Assignee: ZF Active Safety GmbH, Koblenz (DE)

(*) Notice: Subject to any disclaimer, the term of this patent is extended or adjusted under 35 U.S.C. 154(b) by 706 days.

(21) Appl. No.: 17/988,805

(22) Filed: Nov. 17, 2022

(65) Prior Publication Data

US 2023/0150471 A1 May 18, 2023

(30) Foreign Application Priority Data

Nov. 17, 2021 (DE) ......................... 102021129963.2
Aug. 2, 2022 (DE) ......................... 102022119397.7

(51) Int. Cl.

| | |
|---|---|
| ***B60T 13/74*** | (2006.01) |
| ***B60T 1/06*** | (2006.01) |
| ***F16D 55/226*** | (2006.01) |
| ***F16D 55/28*** | (2006.01) |
| ***F16D 65/097*** | (2006.01) |
| ***F16D 65/18*** | (2006.01) |
| *F16D 121/24* | (2012.01) |
| *F16D 125/40* | (2012.01) |

(52) U.S. Cl.

CPC ............ *B60T 13/746* (2013.01); *B60T 1/065* (2013.01); *F16D 55/226* (2013.01); *F16D 55/28* (2013.01); *F16D 65/0971* (2013.01); *F16D 65/18* (2013.01); *F16D 2121/24* (2013.01); *F16D 2125/40* (2013.01); *F16D 2200/0004* (2013.01); *F16D 2250/0061* (2013.01); *F16D 2250/0076* (2013.01)

(58) Field of Classification Search

CPC ............. F16D 2121/24; F16D 2125/40; F16D 2125/48; B60T 13/741

See application file for complete search history.

(56) References Cited

U.S. PATENT DOCUMENTS 6,315,086 B1 * 11/2001 Schmitt .................. F16D 65/18 188/162
6,554,109 B1 * 4/2003 Olschewski ........... F16H 25/24 188/162

(Continued)

FOREIGN PATENT DOCUMENTS

DE 3013862 A1 10/1981
DE 19944876 A1 3/2001

(Continued)

*Primary Examiner* — Nicholas J Lane
(74) *Attorney, Agent, or Firm* — Kristin L. Murphy

(57) ABSTRACT

The disclosure relates to a vehicle brake actuator and an electromechanical brake. The vehicle brake actuator comprises a brake housing, a spindle drive which is arranged in the brake housing and which has a spindle and a spindle nut mounted on the spindle, and a brake piston and a pot sleeve. The brake piston is movable between a retracted and a deployed position in order to apply a brake pad to a brake rotor. The brake piston is at least partially guided in axially displaceable fashion in an interior space of the pot sleeve. The pot sleeve has a base and is pushed in its longitudinal direction into the brake housing and is mounted radially therein.

18 Claims, 7 Drawing Sheets

(56) References Cited

U.S. PATENT DOCUMENTS

| | | | | |
|---|---|---|---|---|
| 2008/0271553 | A1* | 11/2008 | Wang | F16D 65/18<br>74/89.34 |
| 2011/0011191 | A1* | 1/2011 | Osterlaenger | F16C 33/543<br>74/89.23 |
| 2012/0090418 | A1* | 4/2012 | Barthlein | F16D 65/18<br>74/424.81 |
| 2018/0273010 | A1* | 9/2018 | Eguchi | F16D 65/02 |

FOREIGN PATENT DOCUMENTS

| | | | |
|---|---|---|---|
| DE | 60003887 | T2 | 1/2004 |
| DE | 102007042654 | A1 | 3/2009 |
| DE | 102010040426 | A1 | 4/2011 |
| DE | 102009036884 | A1 | 5/2011 |
| DE | 102016104562 | A1 | 9/2017 |
| DE | 102016116967 | A1 | 3/2018 |
| DE | 112019005756 | T5 | 8/2021 |
| WO | 1999045292 | A1 | 9/1999 |
| WO | 2019118289 | A1 | 6/2019 |

* cited by examiner

VEHICLE BRAKE ACTUATOR AND ELECTROMECHANICAL BRAKE

CROSS-REFERENCE TO RELATED APPLICATION

This application claims priority to German Priority Application No. 102021129963.2, filed Nov. 17, 2021 and German Patent Application No. 102022119397.7, filed Aug. 2, 2022, the disclosure of which is incorporated herein by reference in its entirety.

TECHNICAL FIELD

The present disclosure relates to a vehicle brake actuator and an electromechanical brake.

BACKGROUND

In electromechanical brakes, a brake-application force by which corresponding friction pads are placed in engagement with the brake disc is affected by a brake piston that is driven by an electric motor via a spindle drive. Here, the brake-application force is affected by way of a displaceability of the brake piston. The brake-application force that is provided gives rise to a reaction force in the opposite direction, which reaction force must be accommodated by a force-supporting device of the brake. This means that a brake actuator must be provided which firstly ensures displaceability of the brake piston but secondly can accommodate the reaction force that arises as a result of the brake-application force. In order to ensure these different functionalities, known brake actuators have a multiplicity of individual components that must be separately installed. The production of the brake actuator and of the brake thus involves great outlay.

There is therefore a demand to eliminate or at least alleviate the disadvantages of the prior art.

SUMMARY

According to one aspect, a vehicle brake actuator for an electromechanical brake is provided. The vehicle brake actuator comprises a brake housing, a spindle drive which is arranged in the brake housing and which has a spindle and a spindle nut mounted on the spindle, and a brake piston and a pot sleeve. The brake piston is movable between a retracted and a deployed position in order to apply a brake pad to a brake rotor. The pot sleeve has an interior space in which the brake piston is at least partially guided in axially displaceable fashion. The pot sleeve has a base and is pushed in its longitudinal direction into the brake housing and is mounted radially therein.

The spindle drive is configured to ensure linear displaceability of the brake piston relative to the spindle. Due to the spindle drive, the brake piston that acts as spindle nut can be moved in an axial direction. The brake piston can thus exert a brake-application force on at least one brake pad of the brake, such that frictional engagement with a brake disc can be generated. This means that the spindle can be rotated about the axis of rotation, and that this rotation causes a translational movement of the brake piston along the axial direction in order to provide brake-application forces for at least one brake pad. The generated brake-application forces give rise to oppositely oriented reaction forces, which generally have eccentric force components.

The vehicle brake actuator configured in this way creates a preassemblable subassembly of the brake, which is self-contained and delimited with respect to other components of the brake. For example, the pot sleeve can also ensure that the vehicle brake actuator can be sealed off with respect to other components of the brake.

Additionally, the vehicle brake actuator can, by way of the pot sleeve, be installed as a whole into the brake housing of the brake in a single assembly step. Here, the vehicle brake actuator is installed into the brake housing, and subsequently mounted therein, by simply being pushed in. The outlay on production is thus reduced.

Furthermore, owing to a dual functionality of the brake piston, radial structural space is saved in a radial direction relative to the axis of rotation of the spindle. The saving of radial structural space makes it possible to provide a pot sleeve that ensures a self-contained form of the vehicle brake actuator. Furthermore, the saving of radial structural space makes it possible to enlarge the core diameter of a thread of the spindle nut in a radial direction. For example, the core diameter can be enlarged without this causing an enlargement of the structural space required for the brake as a whole along the radial direction.

The enlargement of the core diameter has the effect that the force engagement point for eccentric force components of the reaction forces that arise as a result of the brake-application forces are shifted outwards in a radial direction. As a result, the eccentric force components are diminished in terms of their effect. This directly gives rise to a stabilization of the orientation and mounting of the components of the vehicle brake actuator. Altogether, the vehicle brake actuator configured in this way makes possible an improved exertion of force on the brake piston and thus on the brake pad of the brake, and reduced wear.

The pot sleeve comprises a side wall adjacent to the base. The brake piston is at least partially received in the interior space of the pot sleeve. The interior space is defined by a free internal volume enclosed by the side wall and the base of the pot sleeve, which internal volume is delimited by the side wall and the base. Since the brake piston is displaceable along the axial direction, it can generally also be only partially arranged in the interior space of the pot sleeve, and may at least partially extend beyond said interior space.

In one exemplary arrangement, the base of the pot sleeve is configured to accommodate reaction forces that arise as a result of the brake-application forces. The accommodated reaction forces can then be transmitted onwards from the base of the pot sleeve.

The pot sleeve is optionally arranged in a rotationally secured manner in the brake housing of the vehicle brake actuator. For example, positive engagement between the brake housing and the pot sleeve may be provided, which prevents a rotation of the pot sleeve relative to the brake housing.

For the rotational securing of the pot sleeve may involve a tongue-and-groove connection or a tangential pin connection.

Alternatively or in addition, the pot sleeve may also be radially pressed into the brake housing. Rotational securing of the pot sleeve relative to the brake housing is thus likewise ensured.

The pot sleeve and the brake piston are optionally accommodated in the brake housing. The pot sleeve has an axial stop by which it is supported on the brake housing when the brake is actuated, for example when the brake is closed and/or when the brake is opened. In this way, the reaction forces can be transmitted from the base of the pot sleeve via the side wall of the pot sleeve to the brake housing. The entire brake housing thus acts as a force-supporting device with regard to the reaction forces that are to be absorbed.

A "closing" is to be understood to mean an actuation of the brake in the case of which the brake-application force is increased at least in certain phases; an "opening" is to be understood to mean an actuation of the brake in the case of which the brake-application force is withdrawn at least in certain phases. Here, an actuation of the brake may comprise successive phases of "closing" and "opening", for example in the context of anti-lock braking control.

The stop is optionally a radial shoulder formed integrally on the pot sleeve or is a fastening arrangement attached to the pot sleeve.

In one exemplary arrangement, the radial shoulder may be integral with a side wall of the pot sleeve.

In one exemplary arrangement, the fastening arrangement comprises a circlip. The circlip may for example be arranged in a radial groove of the pot sleeve. The circlip may also be of multi-layer form.

The spindle is optionally supported axially on the base of the pot sleeve when the brake is actuated. It can thus be ensured that the reaction force is transmitted from the spindle, via the base of the pot sleeve and the side wall thereof, to the brake housing.

For example, a spindle bearing with a bearing contact surface is arranged between the base of the pot sleeve and the spindle, which spindle bearing is configured to accommodate radial reaction forces when the brake is actuated. The spindle bearing also makes it possible to compensate eccentric force components of the reaction force.

For example, the spindle bearing has rotational symmetry. In this way, the spindle bearing can be of aft-round uniform design with respect to the axis of rotation of the spindle.

In one exemplary arrangement, the bearing contact surface of the spindle bearing is of spherical shape.

A spherical bearing contact surface is to be understood to mean a bearing surface that has a spherical contour. For example, the spherical bearing contact surface may be of convex or concave shape. A restoring force in the direction of an axis of rotation of the spindle is then effected by the curvature of the spherical bearing contact surface. Here, the spherical contour ensures that the restoring force increases with increasing distance of the force engagement point from the axis of rotation of the spindle. This means that, with suitable selection of the force engagement point, greater restoring forces are effected, which force the spindle into an orientation along the axis of rotation.

In one exemplary arrangement, the spindle comprises, at a brake pad side, a shank portion of thickened cross section, which on the outer shell has the mechanism screw of the spindle drive. Furthermore, the spindle has a drive shaft projection of smaller cross section in relation to said shank portion, and has a transition portion between the shank portion and the drive shaft projection. The spindle bearing bears against a contact surface provided by the transition portion. In other words, the radial extent of the spindle varies along the axial direction, specifically such that the spindle has a relatively small radial extent at the end situated opposite the brake pad and has a relatively large radial extent at the end at the brake pad side. Since the transition portion of the spindle is arranged between these portions and constitutes a narrowing of the spindle in terms of the radial extent, the outer surface of the transition portion can advantageously be utilized for contact with the spindle bearing.

In one exemplary arrangement, the contact surface of the transition portion of the spindle may be rotationally symmetrical.

In one exemplary arrangement, the contact surface of the transition portion of the spindle is of spherical shape and corresponds to the bearing contact surface of the spindle bearing.

By virtue of the fact that the contact between the spindle and the spindle bearing is provided in the region of the transition portion of the spindle, the spindle bearing delimits the thickened shank portion in the direction of the drive shaft projection. If the core diameter of the thickened shank portion is smaller than the outer diameter of the spindle bearing, it is ensured by the spindle bearing that a separate thread run-out of the spindle drive in the direction of the transition portion can be avoided. In this way, length advantages along the axial direction can be realized even in the case of large thread pitches of the spindle drive. Furthermore, the outlay on the manufacture of the vehicle brake actuator is reduced.

Optionally, the spindle bearing is an axial bearing via which the axial reaction forces of the spindle are accommodated. The axial bearing may comprise an axial rolling bearing. The axial bearing ensures the rotatability of the spindle relative to the pot sleeve without this involving an increased friction moment.

The spindle bearing may, on the side situated opposite the spherical bearing contact surface, have a planar contact surface on a bearing ring by way of which said spindle bearing is supported axially on the adjacent rolling elements. In this way, the spindle bearing, with the spherical bearing contact surface and the opposite planar contact surface, ensures the most uniform possible contact between the rolling elements and the bearing ring, because the rotational degrees of freedom transversely with respect to the axis of rotation of the spindle are not eliminated, and therefore microscopic and macroscopic angular offsets, or eccentric applications of force, can be compensated.

The spherical bearing contact surface of the spindle bearing and/or the complementary contact surface on the transition portion may be of convex or concave shape.

It is advantageous if one of the two contact surfaces, that is to say either the spherical bearing contact surface of the spindle bearing or the complementary contact surface of the transition portion, is of convex shape, whereas the other of the two contact surfaces is of concave shape.

Optionally, the spherical bearing contact surface of the spindle bearing has a first curvature radius and the complementary contact surface of the transition portion has a second curvature radius. The first curvature radius and the second curvature radius are advantageously different. This leads to linear contact (on a circular line) between the complementary contact surface and the bearing contact surface, for example in a situation without application of force. If the brake-application force is generated and the reaction forces thus arise, then, proceeding from the linear contact, areal contact between the contact surfaces arises with increasing force owing to elastic flattening of the surfaces. Close contact thus arises between the contact surfaces. It can thus be ensured that the centring action is intensified with increasing force.

In one exemplary arrangement, at least a first centre of the first or of the second curvature radius has a radial offset relative to the respective axis of rotation (spindle bearing or spindle). Owing to the radial offset, the circular line that describes the contact between the spherical bearing contact surface and the complementary contact surface of the transition portion is enlarged in terms of its diameter in a radial direction relative to the axis of rotation of the spindle. The contact angle between the contact surfaces is also enlarged. An enlargement of the contact angle and of the diameter of the circular curve reduce the contact pressure in the contact zone. Wear is thus advantageously reduced.

It is optionally also possible for both centres of the first and of the second curvature radius to have a radial offset relative to the axis of rotation of the spindle. In this way, the circular line that describes the contact can additionally be adapted as required.

In one exemplary arrangement, the spindle bearing, configured as an axial bearing, is supported on the base of the pot sleeve. The pot sleeve is oriented such that the open end is arranged in the direction of the brake disc and of the brake pad, that is to say at the brake pad side, and such that the base of the pot sleeve is arranged oppositely in relation thereto in an axial direction. This means that the brake-application forces that are generated act in an axial direction along the open end of the pot sleeve, whereas the reaction forces that arise as a result act in the direction of the base. By virtue of the fact that the axial bearing is supported on the base, the axial bearing is thus arranged between the base and the spindle along the direction of action of the reaction forces. In this way, the axial bearing can effectively accommodate the reaction forces.

In one exemplary arrangement, the base of the pot sleeve has an elevated plateau that extends axially from the base in the direction of the brake rotor. In this way, the spindle bearing can be positioned further into the interior of the brake piston. The axial length of a brake caliper of the brake can thus be shortened. In this way, the structural space required in an axial direction can be reduced.

A bearing disc is arranged axially between the base of the pot sleeve and the rolling elements of the spindle bearing, which bearing disc is pressed into the pot sleeve so as to be secured against rotation by frictional engagement and/or positive engagement. The pot sleeve, owing to its geometry, is a more complex component than the bearing disc. By the bearing disc, the base of the pot sleeve can be protected against damage by the axial bearing (if this were in direct contact with the base), which damage could generally be caused in the case of a worn axial bearing and under the action of the reaction forces. Thus, if required, it is merely necessary to exchange the bearing disc or the entire axial bearing, but not necessarily the pot sleeve.

In one exemplary arrangement, the bearing disc may have two opposite planar contact surfaces, of which one is in contact with the base of the pot sleeve and one is in contact with the rolling elements. This yields the additional advantage that the outlay on manufacturing in order to ensure the quality of the contact surface of the base of the pot sleeve can be lower.

The rolling elements of the axial bearing then roll, at one side, on the planar contact surface of the bearing ring at the brake-pad-side end of the spindle bearing, and, at the other side, on a planar contact surface of the bearing disc, which likewise forms a bearing ring.

In order to realize a radially even more compact construction, the brake piston is formed as a spindle nut by virtue of the spindle thread being formed on its inner side. The circumferential wall of the brake piston with the circumferential surface thus transitions integrally into the thread of the spindle in order to simultaneously form the spindle nut. The brake piston may consequently be configured as a single piece.

Optionally, a rotational locking arrangement is provided between the pot sleeve and the brake piston that is accommodated in linearly displaceable fashion in said pot sleeve. The rotational locking arrangement ensures the linear displacement of the brake piston by preventing a rotation of the brake piston relative to the pot sleeve.

In one exemplary arrangement, the rotational locking arrangement comprises an elongated hole with which a rotational securing element engages.

In one exemplary arrangement, at the brake pad side, a seal is provided between the brake piston and the pot sleeve. In this way, the interior space provided by the pot sleeve can be sealed off with respect to other parts of the brake housing. For example, the spindle drive arranged in the interior space of the pot sleeve is thus protected against contamination.

Optionally, the brake piston has, at the brake pad side, an end wall that presses against a brake pad when the brake is closed. The end wall may have a circular-ring-shaped end surface. In this way, the force engagement point of the brake-application force that acts on the brake pad is shifted radially outward, allowing an already more uniform application of load to the brake pad. The application of force to the brake pad is thus improved.

The brake housing has or forms a brake caliper.

Optionally, the thread of the brake piston has a core diameter that is greater than an outer diameter of the spindle bearing. In this way, the force engagement point for the eccentric force components of the reaction force is shifted outwards along the radial direction to such an extent as to be arranged radially outside the spindle bearing. This results in the effect of the eccentric force components being reduced, and these can, overall, be compensated by the spindle bearing. In this way, the orientation and mounting of the components of the vehicle brake actuator are improved, which likewise allows an optimization of the application of force to the brake piston.

In order to be implement such a large core diameter of the brake piston, sufficient radial structural space must be provided (without the structural space of the brake as a whole being enlarged), which in the present case is achieved by virtue of the brake piston also combining the functionality of the spindle nut.

The spindle drive has a recirculating ball screw. In a recirculating ball screw, balls transmit the force between the spindle and the brake piston, which acts as a spindle nut. Friction and wear are reduced owing to the rolling movement of the balls.

A recirculating ball screw has no self-locking action. This means that, owing to elasticities inherent in the system, the brake piston also automatically moves back into the fully retracted position when it is no longer being actively forced into a deployed position by a motor, for example an electric motor. In the fully retracted position of the brake piston, the brake-application force is fully withdrawn, such that the brake is fully "open".

A rotation of the spindle is ensured by an electric motor and a reduction gearing that meshes with the drive shaft projection of the spindle.

The pot sleeve in which the spindle is mounted optionally has a positively engaging displaceable connection to the gearing that is utilized for the drive of the spindle. Centring of the gearing of the drive relative to the pot sleeve is thus ensured.

In one exemplary arrangement, the positively engaging connection between the pot sleeve and the gearing of the drive has a shaft-hub connection with a spline toothing or a tongue-and-groove connection.

In one exemplary arrangement, the pot sleeve together with the brake piston is sealed off with respect to the brake housing of the brake by a dust cap in the form of a corrugated bellows. A sealing function of the dust cap is ensured over an entire axial stroke movement of the screw drive. In this way, it is possible for the spindle drive to be protected against contamination.

According to a further aspect, an electromechanical brake is also provided, having an electric motor for actuating the brake, for closing and/or for opening the brake, which electric motor is coupled in torque-transmitting fashion to the brake piston, and having a vehicle brake actuator as described above.

The electromechanical brake may be configured to serve as a vehicle brake with brake pads and a brake disc.

According to a further aspect, a vehicle having an electromechanical brake as described above is also provided.

Optionally, the vehicle may comprise a motor vehicle, that is to say a road-going vehicle. Alternatively, the vehicle may also comprise other vehicle types, for example aircraft, ships, two-wheeled vehicles, motorcycles, or the like. Overall, in the present case, a vehicle is to be understood to mean an apparatus that is configured for transporting articles, freight or people between different destinations. Examples of vehicles are land-going vehicles such as motor vehicles, electric vehicles, hybrid vehicles or the like, rail vehicles, aircraft, or watercraft. In the present context, vehicles may be regarded as road-bound vehicles, such as cars, trucks, buses or the like.

All features discussed with regard to the various aspects may, individually or in (sub-) combination, be combined with other aspects.

BRIEF DESCRIPTION OF DRAWINGS

The disclosure and further advantageous exemplary arrangements and refinements thereof will be described and discussed in more detail below on the basis of the examples illustrated in the drawings. In the drawings.

DETAILED DESCRIPTION

The following detailed description in conjunction with the appended drawings, in which identical elements are denoted by the same reference designations, is intended as a description of different exemplary arrangements of the disclosed subject matter, and is not intended to represent the only arrangements. Each exemplary arrangement described in this disclosure serves merely as an example or for illustration, and is not to be interpreted as being preferred or advantageous in relation to other exemplary arrangements.

All features disclosed below with regard to the exemplary arrangements and/or the appended figures may, individually or in any desired sub-combination, be combined with features of the aspects of the present disclosure, including features of preferred exemplary arrangements, assuming that the resulting combination of features is meaningful to a person skilled in the art in the technical field.

Figure 1:
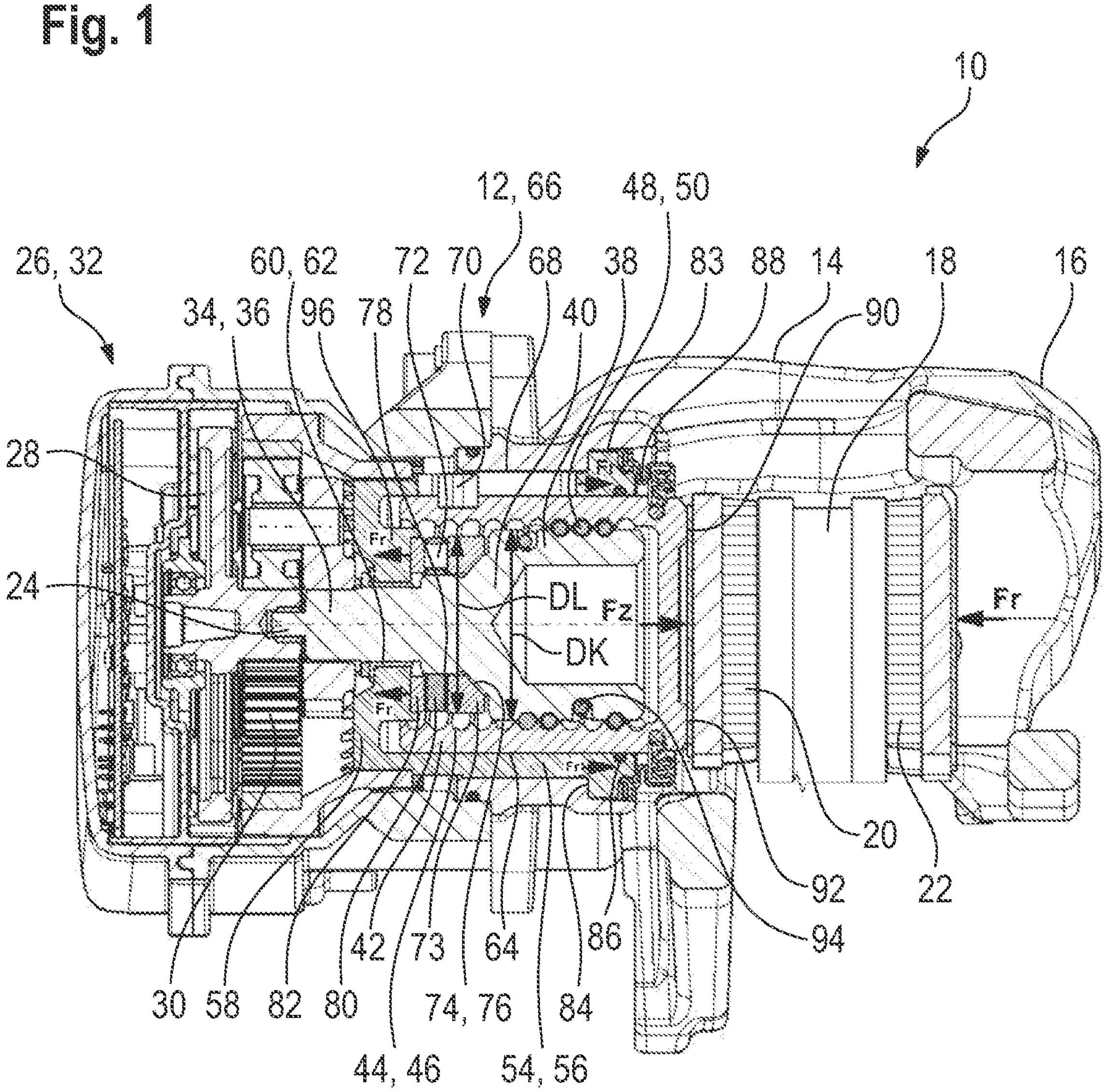
FIG. 1 shows a simplified schematic cross-sectional view of an electromechanical brake according to the disclosure having a vehicle brake actuator according to the disclosure according to a first exemplary arrangement of the disclosure.

FIG. 1 shows a simplified schematic cross-sectional view of an electromechanical brake 10 having a vehicle brake actuator 12 according to a first exemplary arrangement.

The brake 10 comprises a brake housing 14 with a brake caliper 16 as part of the brake housing 14. The brake housing 14 may at least partially also be assigned to the vehicle brake actuator 12. The brake caliper 16 surrounds a brake disc 18, for example a brake disc rotor, which is enclosed in an axial direction by two brake pads 20, 22. The inner brake pad 20 along the axis of rotation 24 of the vehicle brake actuator 12 is actively subjected to a brake-application force Fz by the vehicle brake actuator 12. In the present case (in the ideal situation of compensated transverse forces), the axis of rotation 24 of the vehicle brake actuator 12 also corresponds to the cylinder axis of the brake housing 14 and the brake disc axis of rotation of the brake disc 18.

The axially displaceable brake caliper 16 ensures that the outer brake pad 22 in the axial direction is likewise subjected to the brake-application force Fz. Here, the brake-application force Fz is distributed substantially uniformly, in terms of magnitude, between the inner brake pad 20 and the outer brake pad 22. Thus, for both brake pads 20, 22, owing to the pressing force that is provided, frictional engagement with the brake disc 18 can be ensured, which frictional engagement is utilized for the deceleration or immobilization of a vehicle.

The brake 10 furthermore has an electromechanical actuating unit 26 that is utilized, together with the vehicle brake actuator 12, to generate the brake-application force Fz. Relative to the vehicle brake actuator 12, the electromechanical actuating unit 26 is arranged on the opposite side in relation to the brake disc 18 along the axis of rotation 24. The electromechanical actuating unit 26 comprises at least one electric motor 28 and one reduction gearing 30.

The components of the electromechanical actuating unit 26 are accommodated by the brake housing 14, which may be configured as a skeleton-like frame composed of metal or of fibre-reinforced plastic. The electromechanical actuating unit 26 forms a closed, separately installable subassembly 32.

The vehicle brake actuator 12 comprises a spindle 34 with a drive shaft projection 36, with a second shank portion 38 at a brake pad side, and with a transition portion 40 that is arranged between the drive shaft projection 36 and the shank portion 38 along the axis of rotation 24 of the spindle 34. The diameter of the drive shaft projection 36 of the vehicle brake actuator 12 along the radial direction is smaller than the diameter of the shank portion 38 along this direction. Correspondingly, the spindle 34 narrows in terms of its diameter in the region of the transition portion 40.

The vehicle brake actuator 12 furthermore has a brake piston 42 that is configured as a spindle nut. The spindle drive 44 of the vehicle brake actuator 12 is in the present case configured as a recirculating ball screw that has no self-locking action. Here, the spindle drive 44 comprises a mechanism screw 46 in which balls 48 are arranged and roll. The spindle 34 and the brake piston 42 have mutually corresponding raceway parts. The balls 48 can, along the ball raceways 50 of the mechanism screw 46, allow a translational movement of the brake piston 42 relative to the spindle 34 along the axis of rotation 24. For this purpose, the ball raceways 50 are formed at least partially in the shank portion 38 of the spindle 34 and in the brake piston 42.

The diameter of the ball raceways 50 corresponds, taking into consideration manufacturing tolerances and required gap dimensions, to the diameter of the balls 48.

The translational movement of the brake piston 42 in the direction of the brake disc 18 causes the brake piston 42 to be moved in the direction of the inner brake pad 20 and thus ensures that the brake-application force Fz is actively applied to the inner brake pad 20.

The vehicle brake actuator 12 furthermore comprises a pot sleeve 54 that has a side wall 56 and a base 58. The open end of the pot sleeve 54 is arranged at a brake pad side along the axis of rotation 24. This means that the base 58 is provided at the opposite end of the pot sleeve 54 in relation to the brake disc 18. The base 58 has a passage hole 60 for the drive shaft projection 36 of the spindle 34, which is held in said passage hole by a radial bearing 62.

The side wall 56 and the base 58 define an interior space 64 of the pot sleeve 54, in which at least the spindle 34 and the brake piston 42 are at least partially arranged. Owing to the linear displaceability of the brake piston 42, this can also be arranged at least partially outside the interior space 64.

The pot sleeve 54 makes it possible for the vehicle brake actuator 12 to be configured as a separate subassembly 66. The brake housing 14 has, for the subassembly 66, a corresponding receiving space 68 in which the subassembly 66 can be positioned and thus mounted radially and axially therein.

Within the vehicle brake actuator 12, the brake piston 42 is guided linearly, and secured against rotation, relative to the brake housing 14 and the pot sleeve 54 by a rotational locking arrangement 70. For this purpose, the brake piston 42 may have an axial groove that engages with a rotational securing element.

Here, the rotation of the spindle 34 is ensured by the electric motor 28, which engages with the drive shaft projection 36 of the spindle 34 via the reduction gearing 30. The rotation of the spindle 34 in conjunction with the rotational blocking of the brake piston 42 ensures a translational movement of the brake piston 42. This movement is transmitted to the brake pads 20, 22. The brake-application force Fz that is generated is proportional to the torque that is imparted to the drive shaft projection 36 by the electric motor 28 and the reduction gearing 30.

Owing to the brake-application force Fz that is generated, a reaction force Fr that is opposed to the brake-application force Fz arises along the axis of rotation 24. Owing to the elastic expansion of the components of the brake 10, an angular offset may generally arise between the brake disc axis of rotation and the cylinder axis of the brake housing 14, such that the reaction force Fr has eccentric force components. These eccentric force components can lead to an instability of the components of the vehicle brake actuator 12 along the radial direction, if the core diameter DK of the thread of the brake piston 42 is smaller than the outer diameter DL of a bearing that is intended to accommodate the reaction force Fr.

Thus, the elimination of an otherwise conventional separate spindle nut, by virtue of the fact that the brake piston 42 assumes the function of said spindle nut, has the effect that the brake piston 42 can be enlarged in a radial direction. In this way, despite an unchanged radial structural space of the brake 10, it is made possible to enlarge the core diameter DK.

In one exemplary arrangement, the core diameter DK can be radially enlarged so as to be greater than the outer diameter DL of a spindle bearing 72 of the vehicle brake actuator 12 in a radial direction, which spindle bearing accommodates the reaction force Fr. It is thus made possible for the force engagement point of the eccentric force components of the reaction force Fr to be shifted radially outwards to such an extent that the effect of the eccentric force components is diminished, and the compensation by the spindle bearing 72 is ensured even without special bearing geometries of the spindle bearing 72. Thus, the orientation and mounting of the individual components of the vehicle brake actuator 12, and the application of force to the brake pads 20, 22, are improved.

In the present case, the spindle bearing 72 is of rotationally symmetrical design, and is configured as an axial bearing.

In the present case, the spindle bearing 72 has, on a bearing ring 73, a bearing contact surface 74 which faces towards the transition portion 40 and which is in contact with a complementary contact surface 76 provided by the transition portion 40 of the spindle 34. The bearing contact surface 74 and the contact surface 76 may be planar. For example, the bearing contact surface 74 and the contact surface 76 may extend perpendicular to the axis of rotation 24 (not shown here).

In order to further improve the compensation of the eccentric force components of the reaction force Fr, the bearing contact surface 74 of the spindle bearing 72 and the contact surface 76 of the transition portion 40 are of spherical shape in the present exemplary arrangement.

In this exemplary arrangement, one of the two contact surfaces of this contact, that is to say either the spherical bearing contact surface 74 of the spindle bearing 72 or the complementary contact surface 76 of the transition portion 40, is of concave shape, whereas the other is of convex shape.

In one exemplary arrangement, the contact surfaces 74, 76 have different curvature radii, whereby, in the situation without application of force, linear contact in the form of a circular line between the bearing ring of the spindle bearing 72 and the transition portion 40 of the spindle 34 is ensured. The centre of the circular line is congruent with the axis of rotation 24 of the spindle 34. With increasing reaction force Fr, elastic flattening of the contact surfaces 74, 76 has the effect that the linear contact widens to become areal contact.

In order for the diameter of the circular line at the midpoint of the contact angle to be made as large as possible, the centre of the curvature radius of the spherical bearing contact surface 74 and/or the centre of the curvature radius of the complementary contact surface 76 may each have an offset, along the radial direction, with respect to the respective axis of rotation of the spindle bearing 72 or of the spindle 34. Such an offset has the effect that the diameter of the circular line is enlarged, and the contact between the contact surfaces 74, 76 is shifted outwards in a radial direction. It is thus made possible for restoring forces of greater magnitude in the direction of the axis of rotation 24 of the spindle 34 to be generated. For example, the enlargement of the contact angle and of the diameter of the circular line has the effect that the contact pressure in the contact zone between the contact surfaces 74, 76 is reduced. The centring action of the spherical bearing contact surface 74 of the bearing ring 73 of the spindle bearing 72 is thus improved.

The spindle bearing 72 furthermore has a planar contact surface 78, which is arranged oppositely in relation to the bearing contact surface 74 along the axis of rotation 24.

FIG. 1 illustrates rolling elements 80 of the spindle bearing 72, which rolling elements roll, at a motor side, on a bearing disc 82 which has planar contact surfaces situated oppositely along the axis of rotation 24 and which is pressed into the pot sleeve 54 so as to be secured against rotation by frictional engagement and/or positive engagement. One of the contact surfaces of the bearing disc 82 is in contact with the base 58 of the pot sleeve 54.

Thus, the reaction force Fr that arises is, from the shank portion 38 of the spindle 34, accommodated by the base 58 of the pot sleeve 54 via the spindle bearing 72.

In the region of the brake-pad-side end of the pot sleeve 54, this has, in the present exemplary arrangement, a radially integrally formed shoulder 83 which is formed integrally with the side wall 56 and which provides a stop 84 and by means of which the pot sleeve 54 is supported on the brake housing 14. Thus, the reaction force Fr that is accommodated by the base 58 of the pot sleeve 54 is transmitted via the side wall 56 and the stop 84 to the brake housing 14.

In order to protect the spindle drive 44, the pot sleeve 54 has a radially internally situated groove in which a seal 86 is arranged and which acts between the pot sleeve 54 and the brake piston 42.

The pot sleeve 54 and the brake piston 42 each additionally have a radially externally situated groove in which an additional seal 88 in the form of an encircling corrugated bellows is arranged. In this way, the subassembly 66 of the vehicle brake actuator 12 is sealed off with respect to other parts of the brake 10. The seal 88 is configured to ensure the sealing action over the entire movement travel (stroke) of the brake piston 42.

In the present case, at the brake pad side, the brake piston 42 comprises an end wall 90 with an end surface of circular-ring-shaped form, which is provided for the application of force to the inner friction pad 20. The circular ring shape ensures an optimized force distribution of the brake-application force Fz over the receiving surface 92 of the inner friction pad 20.

The spindle drive 44 comprises ball return guides 94 that are integrated within the spindle 34.

In a pre-assembly step, both the mechanism screws 46 of the spindle 34 and the ball return guides 94 integrated in the spindle 34 can be fully filled with balls 48. The brake piston 42 can subsequently be pushed onto the spindle 34.

By the ball return guides 94, which are integrated in the spindle 34, of the spindle drive 44, it is also ensured that, whilst providing the same stroke, the spindle drive 44 can be configured to be axially shorter than in the case of known and spindle drives without integrated ball return guides. The reason for this is the possibility for the spindle bearing 72, on which the spindle drive 44 is supported at the open end of the brake piston 42, to be able to project a certain distance into the brake piston 42 when the latter is in the retracted state, without the overlap of the balls 48 being eliminated.

In the present case, the pot sleeve 54 furthermore has an elevated plateau 96 which extends axially in the direction of the brake-pad-side end of the pot sleeve 54 proceeding from the base 58 of the pot sleeve 54. By the elevated plateau 96, it is made possible for the spindle bearing 72 and the bearing disc 82 to be positioned axially closer to the brake-pad-side end of the pot sleeve 54. The axial length of the brake caliper 16 of the brake 10 can thus be shortened. In this way, the structural space required in an axial direction can be reduced.

Figure 2:
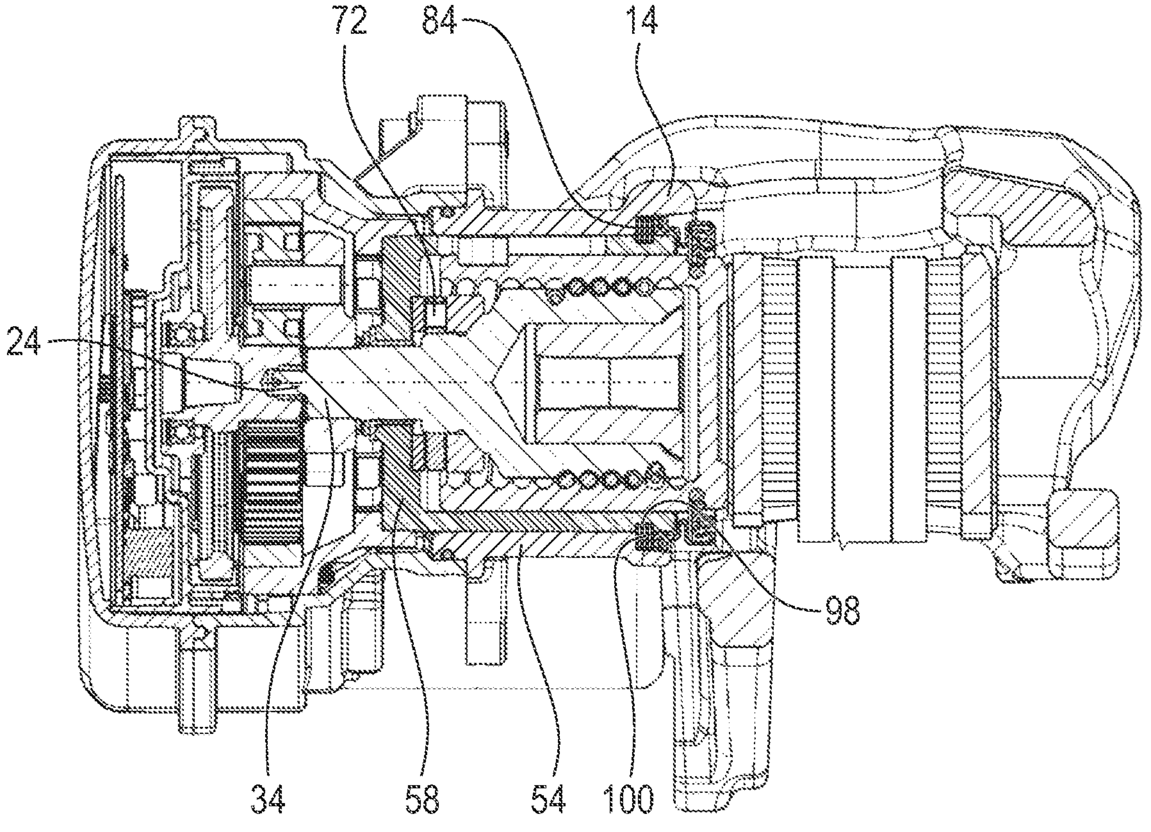
FIG. 2 shows a simplified schematic cross-sectional view of an electromechanical brake according to the disclosure having a vehicle brake actuator according to the disclosure according to a further exemplary arrangement.

FIG. 2 shows a simplified schematic cross-sectional view of an electromechanical brake 10 having a vehicle brake actuator 12 according to a further exemplary arrangement. The exemplary arrangement shown here substantially corresponds to the preceding exemplary arrangement. Therefore, only the differences will be discussed.

In this exemplary arrangement, the pot sleeve 54 of the vehicle brake actuator 12 comprises, instead of a radially integrally formed shoulder 83, a radially externally situated groove 98 in which a fastening 100 is arranged, which provides the stop 84 with respect to the brake housing 14. In the present case, the fastening 100 is a circlip.

This exemplary arrangement provides the additional advantage that the pot sleeve 54 can generally be pushed axially into the brake housing 14 from both sides. In this way, the installation of the pot sleeve 54 is simplified.

Furthermore, the pot sleeve 54 in this exemplary arrangement does not have an elevated plateau 96. The base 58 of the pot sleeve 54 substantially has an axial extent that remains uniform with increasing radial distance to the axis of rotation 24 of the spindle 34. As a result, the pot sleeve 54 has a simpler geometry, whereby the outlay on production is reduced.

Figure 3:
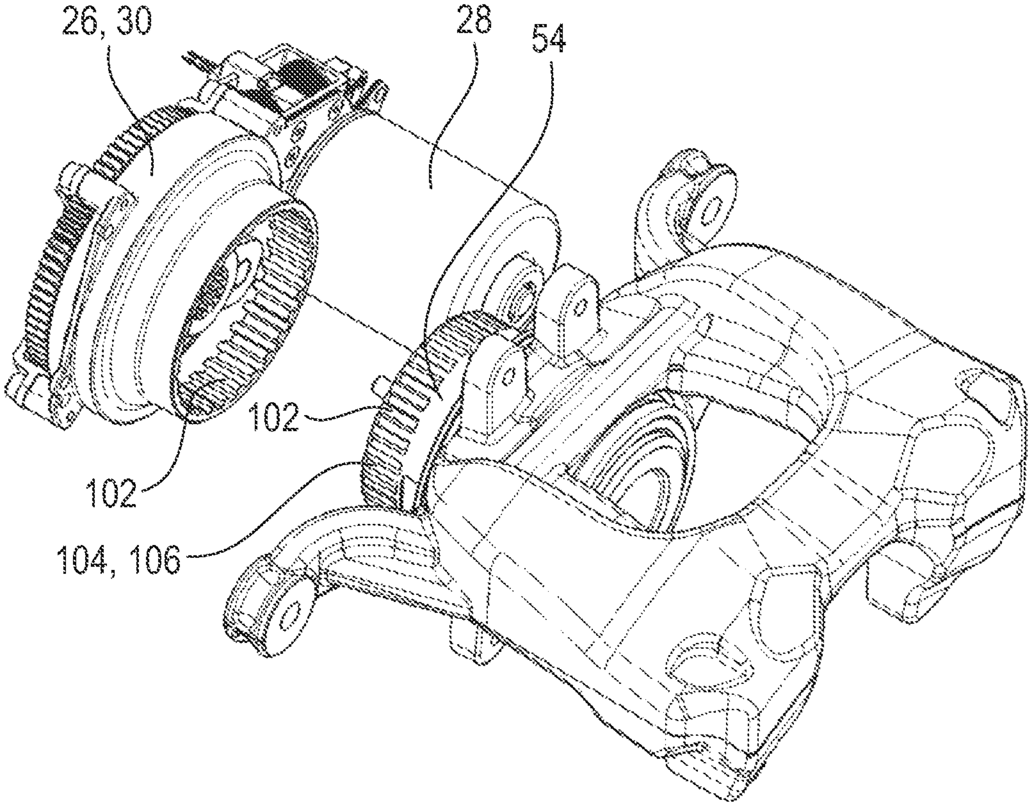
FIG. 3 shows a simplified schematic illustration of the connection between the vehicle brake actuator according to the disclosure and the electromechanical actuating unit according to an exemplary arrangement of the disclosure.

FIG. 3 shows a simplified schematic illustration of the connection between the vehicle brake actuator 12 and the electromechanical actuating unit 26 according to an exemplary arrangement.

By a positively engaging connection 102 that is displaceable along the axis of rotation 24, the pot sleeve 54 is coupled to the electromechanical actuating unit 26 such that the reduction gearing 30 is centred relative to the pot sleeve 54. In this exemplary arrangement, the displaceable positively engaging connection 102 comprises a shaft-hub connection 104 with a spline toothing 106 for transmitting torque.

Figure 4:
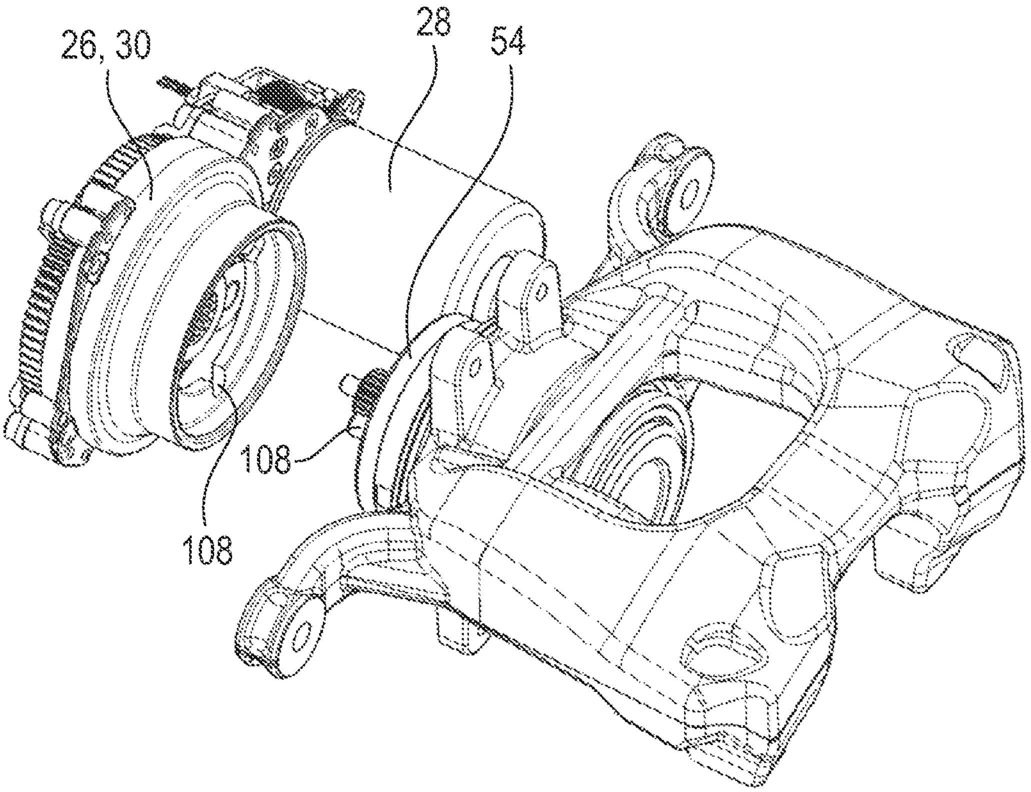
FIG. 4 shows a simplified schematic illustration of the connection between the vehicle brake actuator according to the disclosure and the electromechanical actuating unit according to a further exemplary arrangement of the disclosure.

FIG. 4 shows a simplified schematic illustration of the connection between the vehicle brake actuator 12 and the electromechanical actuating unit 26 according to a further exemplary arrangement. The exemplary arrangement shown here substantially corresponds to the preceding exemplary arrangement. Therefore, only the differences will be discussed.

As an alternative to the shaft-hub connection 104, the pot sleeve 54 in this embodiment has a tongue-and-groove connection 108. The tongue, in this case in the form of a bolt, is in this case pressed into an associated bore that is formed into the base-side end surface of the pot sleeve 54.

Figure 5:
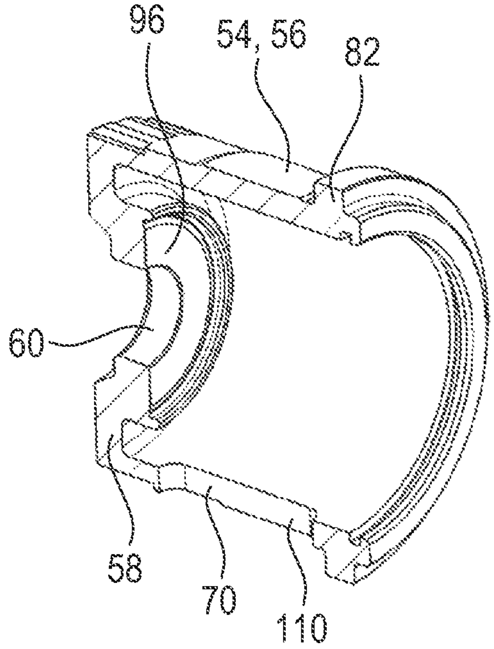
FIG. 5 shows a simplified schematic cross-sectional view of the pot sleeve of the vehicle brake actuator according to the disclosure.

FIG. 5 shows a simplified schematic cross-sectional view of the pot sleeve 54.

The figure shows the passage hole 60 in the base 58 of the pot sleeve 54, which passage hole is provided for the drive shaft projection 36. Proceeding from the base 58, the elevated plateau 96 extends in the direction of the brake-pad-side end of the pot sleeve 54. Furthermore, the pot sleeve 54 according to this exemplary arrangement has a radially integrally formed shoulder 83.

The rotational locking arrangement 70, which acts between the pot sleeve 54 and the brake piston 42, comprises an elongated hole 110 into which a rotational securing element engages.

Figure 6:
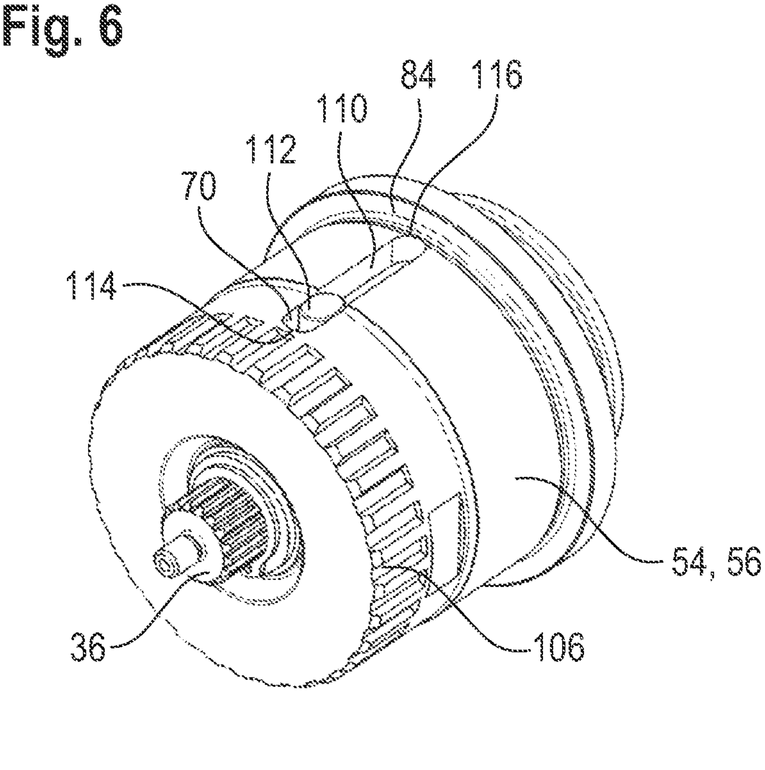
FIG. 6 shows a simplified schematic illustration of the vehicle brake actuator according to the disclosure according to an exemplary arrangement of the disclosure.

FIG. 6 shows a simplified schematic illustration of the vehicle brake actuator 12 according to an exemplary arrangement.

The figure shows that a sliding block 112 is provided, which is positioned in the elongated hole 110 of the rotational locking arrangement 70 and allows linear displaceability of the brake piston 42 with respect to the pot sleeve 54, but which prevents a rotation of the brake piston 42 relative to the pot sleeve 54.

The end stops 114, 116 of the elongated hole 110 for the sliding block 112 define the stroke of the maximum possible movement travel of the brake piston 42 (without brake pads).

Figure 7:
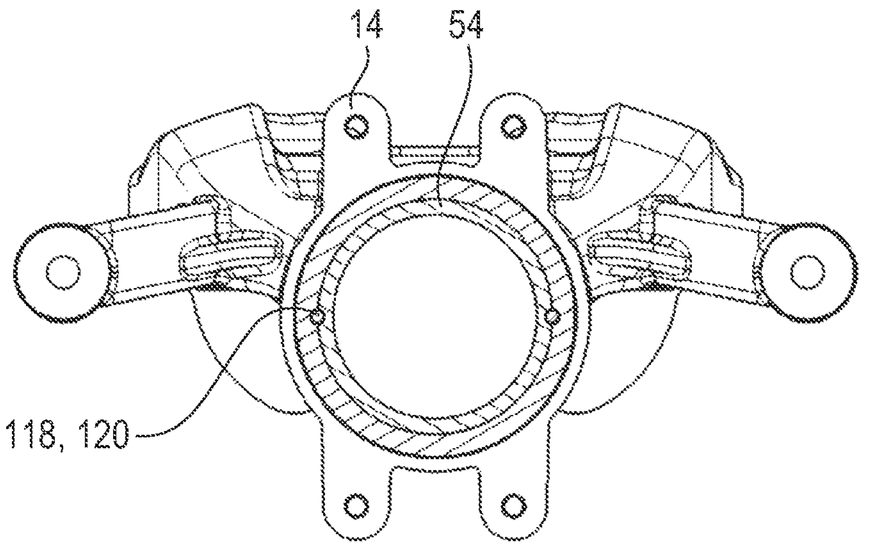
FIG. 7 shows a simplified schematic frontal view of parts of the electromechanical brake according to the disclosure.

FIG. 7 shows a simplified schematic frontal view of parts of the electromechanical brake 10.

The brake housing 14 and the pot sleeve 54 are shown. The pot sleeve 54 is rotationally secured relative to the brake housing 14. The rotational securing means 118 involves positive engagement, which is implemented in the present case by way of a tangential pin connection 120. By virtue of the fact that the pot sleeve 54 is rotationally secured relative to the brake housing 14, the brake piston 42 is rotationally secured relative to the brake housing 14 indirectly via the rotational locking arrangement 70. It is thus ensured that the brake piston 42 does not rotate relative to the brake pad 20, whereby an optimized application of force to the brake pad 20 is ensured.

Figure 8:
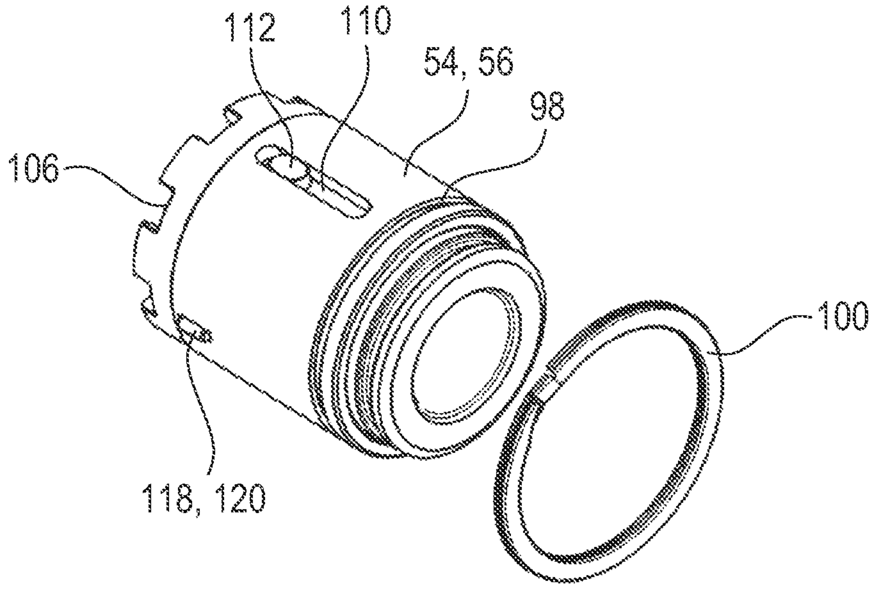
FIG. 8 shows a simplified schematic illustration of the vehicle brake actuator according to the disclosure according to a further exemplary arrangement of the disclosure.

FIG. 8 shows a simplified schematic illustration of the vehicle brake actuator 12 according to a further exemplary arrangement.

The pot sleeve 54 has, in turn, a groove 98 in which a fastening arrangement 100 can be arranged in order to provide the stop 84 for the coupling to the brake housing 14.

It can also be seen that the spline toothing 106 is variable with regard to the number of splines.

Figure 9:
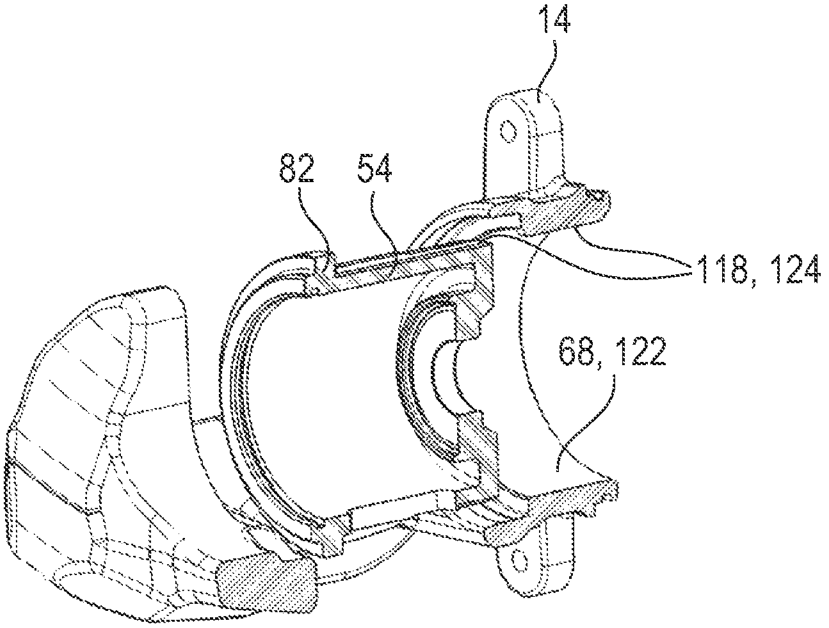
FIG. 9 shows a simplified schematic exploded view of a cross section of the pot sleeve and of the brake housing of the vehicle brake actuator according to the disclosure.

FIG. 9 shows a simplified schematic exploded view of a cross section of the pot sleeve 54 and of the brake housing 14.

It can be seen that the brake housing 14 has a receiving space 68 which corresponds to the pot sleeve 54 and which is provided by way of an at least partially circular cylindrical inner contour 122. The pot sleeve 54 can this be pushed in an axial direction, with an oversize, into the receiving space 68 of the brake housing 14. The pot sleeve 54 is subsequently radially mounted in the receiving space 68.

If the pot sleeve 54 does not have a radially integrally formed shoulder 83 but instead has a radially externally situated groove 98 for a fastening arrangement 100, then the pot sleeve 54 can be pushed into the receiving space 68 in axially opposite directions. The installation of the pot sleeve 54, and of the subassembly 66 of the vehicle brake actuator 12 as a whole, is thus simplified.

Alternatively, the pot sleeve 54 may also be radially pressed into the receiving space 68. By way of a pressing-in operation, rotational securing 118 of the pot sleeve 54 relative to the brake housing 14 can be ensured even without a tangential pin connection 120.

Figure 10:
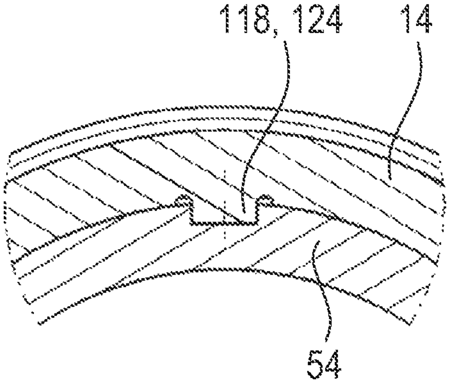
FIG. 10 shows a simplified schematic cross-sectional view of the rotational securing arrangement between the pot sleeve and the brake housing of the vehicle brake actuator according to the disclosure.

In this exemplary arrangement, the rotational securing 118 of the pot sleeve 54 relative to the brake housing 14 is however ensured by positive engagement by a tongue-and-groove connection 124. This is illustrated in FIG. 10 by way of a simplified schematic cross-sectional view of the rotational securing means 118 between the pot sleeve 54 and the brake housing 14.

The invention claimed is:

1. A vehicle brake actuator for an electromechanical brake, comprising: a brake housing, having a spindle drive which is arranged in the brake housing and which has a spindle and a spindle nut mounted on the spindle, and a brake piston, which is movable between a retracted and a deployed position in order to apply a brake pad to a brake rotor, and having a pot sleeve, in an interior space of which the brake piston is at least partially guided in axially displaceable fashion, wherein the pot sleeve has a base and the pot sleeve is pushed in its longitudinal direction into the brake housing and is mounted radially therein, and wherein the spindle is supported axially on the base of the pot sleeve via a spindle bearing configured to accommodate radial reaction forces; and wherein the spindle bearing includes a bearing contact surface of spherical shape, and wherein the spindle has a transition portion between a shank portion and a drive shaft projection, the bearing contact surface bearing against a complementary contact surface on the transition portion.

2. The vehicle brake actuator according to claim 1, wherein the pot sleeve and the brake piston are accommodated in the brake housing, wherein the pot sleeve has an axial stop with which said pot sleeve is supported on the brake housing when the brake is actuated.

3. The vehicle brake actuator according to claim 2, wherein the stop is a radial shoulder formed integrally on the pot sleeve or is a fastening element attached the pot sleeve.

4. The vehicle brake actuator according to claim 1, wherein the bearing contact surface is arranged between the base of the pot sleeve and the spindle.

5. The vehicle brake actuator according to claim 4, wherein the spindle bearing is an axial bearing, via which the axial reaction forces of the spindle are accommodated.

6. The vehicle brake actuator according to claim 5, wherein a bearing disc is arranged axially between the base of the pot sleeve and the rolling elements of the spindle bearing, which bearing disc is pressed against the pot sleeve so as to be secured against rotation by frictional engagement and/or positive engagement.

7. The vehicle brake actuator according to claim 1, wherein the brake piston is formed integrally as a spindle nut, such that a spindle thread is formed on an inner side of the brake piston.

8. The vehicle brake actuator according to claim 1, wherein a rotational locking arrangement is provided between the pot sleeve and the brake piston that is accommodated in linearly displaceable fashion in said pot sleeve, which rotational locking arrangement allows a linear displacement of the brake piston but prevents a rotation of the brake piston relative to the pot sleeve.

9. The vehicle brake actuator according to claim 1, wherein, at the brake pad side, a seal is provided between the brake piston and the pot sleeve.

10. The vehicle brake actuator according to claim 4, wherein a core diameter of a thread of the spindle nut is greater than an outer diameter of the spindle bearing for the purposes of axial displaceability of the brake piston over the spindle bearing.

11. The vehicle brake actuator according to claim 4, wherein the spindle has, at a brake pad side, a shank portion of thickened cross section, which on an outer shell has a screw mechanism of the spindle drive, and has a drive shaft projection of smaller cross section in relation to said shank portion.

12. An electromechanical brake having an electric motor for actuating the brake, which electric motor is coupled in torque transmitting fashion to the brake piston, and having a vehicle brake actuator claim 1.

13. The vehicle brake actuator according to claim 3, wherein the spindle is supported axially on the base of the pot sleeve when the brake is actuated.

14. The vehicle brake actuator according to claim 13, wherein a rotational locking arrangement is provided between the pot sleeve and the brake piston that is accommodated in linearly displaceable fashion in said pot sleeve, which rotational locking arrangement allows a linear displacement of the brake piston but prevents a rotation of the brake piston relative to the pot sleeve.

15. The vehicle brake actuator according to claim 14, wherein, at the brake pad side, a seal is provided between the brake piston and the pot sleeve.

16. A vehicle brake actuator for an electromechanical brake, comprising:

a brake housing having a spindle drive which is arranged in the brake housing and which has a spindle and a spindle nut mounted on the spindle, and a brake piston, which is movable between a retracted and a deployed position in order to apply a brake pad to a brake rotor, wherein the brake piston has a pot sleeve, in an interior space of which the brake piston is at least partially guided in axially displaceable fashion, wherein the pot sleeve has a base and the pot sleeve is pushed in its longitudinal direction into the brake housing and is mounted radially therein, wherein the spindle is supported axially on the base of the pot sleeve when the brake is actuated, wherein a spindle bearing with a bearing contact surface is arranged between the base of the pot sleeve and the spindle, which spindle bearing is configured to accommodate radial reaction forces when the brake is actuated, wherein the spindle has, at a brake pad side, a shank portion of thickened cross section, which on an outer shell has a screw mechanism of the spindle drive, and has a drive shaft projection of smaller cross section in relation to said shank portion, and has a transition portion between the shank portion and the drive shaft projection, wherein the bearing contact surface of the spindle bearing bears against a complementary contact surface on the transition portion, and wherein the bearing contact surface of the spindle bearing and the contact surface of the transition portion are of spherical shape.

17. The vehicle brake actuator according to claim 16, wherein the spherical bearing contact surface has a first curvature radius, wherein the contact surface has a second curvature radius, and wherein the first curvature radius and the second curvature radius are different.

18. The vehicle brake actuator according to claim 17, wherein at least a first centre of the first or of the second curvature radius has a radial offset relative to an axis of rotation of the spindle.

* * * * *